United States Patent [19]
Mori et al.

[11] Patent Number: 5,894,144
[45] Date of Patent: Apr. 13, 1999

[54] SEMICONDUCTOR ACCELERATION SENSOR

[75] Inventors: Masatomo Mori, Miyagi; Takashi Kunimi, Tokyo; Masahiro Nezu; Tadao Matsunaga, both of Saitama; Rokurou Naya; Shougo Suzuki, both of Kanagawa, all of Japan

[73] Assignees: Akebono Brake Industry Co., Ltd., Tokyo; Nihon Inter Electronic Corporation, Hadano, both of Japan

[21] Appl. No.: 08/961,427

[22] Filed: Oct. 30, 1997

[30] Foreign Application Priority Data

Oct. 31, 1996 [JP] Japan .................. 8-289774

[51] Int. Cl.⁶ .................................................. H01L 29/82
[52] U.S. Cl. .................. 257/254; 257/417; 257/418; 257/419; 257/420; 73/717; 73/722; 73/728; 73/DIG. 1; 73/504.12; 73/514.29; 73/514.18
[58] Field of Search ................... 257/254, 417, 257/418, 419, 420; 73/717, 722, 728, DIG. 1, 504.12, 514.29, 514.18

[56] References Cited

U.S. PATENT DOCUMENTS

| | | |
|---|---|---|
| 4,932,261 | 6/1990 | Henrion .................. 73/517 B |
| 5,177,579 | 1/1993 | Jerman .................. 73/724 |
| 5,205,171 | 4/1993 | O'Brien et al. .................. 73/517 B |
| 5,353,641 | 10/1994 | Tang .................. 73/517 R |
| 5,391,283 | 2/1995 | Shimada et al. .................. 73/1 D |
| 5,659,195 | 8/1997 | Kaiser et al. .................. 257/415 |

FOREIGN PATENT DOCUMENTS

| | | |
|---|---|---|
| 4-127574 | 11/1992 | Japan . |
| 4-136575 | 12/1992 | Japan . |

*Primary Examiner*—William Mintel
*Attorney, Agent, or Firm*—Morgan, Lewis & Bockius LLP

[57] ABSTRACT

In a semiconductor acceleration sensor, a weight and thin beam parts adjacent to the weight are formed on a substrate, a moving electrode is formed on the weight, and a fixed electrode is formed at a position of the other substrate opposed to the moving electrode. Both the electrodes come in contact with each other and conduct as a result of acceleration on the weight, whereby the semiconductor acceleration sensor operates. The fixed electrode or the moving electrode is formed with a projection toward the opposed electrode and the projection and the electrode come in contact with each other and conduct by action of acceleration with a predetermined spacing held between both the electrodes for preventing occurrence of chattering caused by the electrostatic attraction force between both the electrodes.

11 Claims, 5 Drawing Sheets

SEMICONDUCTOR ACCELERATION SENSOR

BACKGROUND OF THE INVENTION

The present invention relates to an acceleration sensor and in particular to an acceleration sensor having a switching mechanism using a semiconductor microworking technology.

In recent years, acceleration sensors have been used as means for indirectly detecting an action force of impact, etc., without coming in direct contact with an object. The acceleration sensors cover various applications; it is desired that the acceleration sensor is compact and lightweight, does not require a mounting space on an object, and operates precisely and reliably.

As a predetermined acceleration detection sensor, a sensor using a conductive sphere displaced according to acceleration and connecting two contacts by the conductive sphere is disclosed in Japanese Utility Model Laid-Open Nos. Hei. 4-136575 and 4-127574.

However, the mechanical acceleration switch connecting two contacts by a conductive sphere becomes large in the outside shape because of its structure, so it is poor in responsiveness and it has an accuracy problem. If such a mechanical acceleration switch is miniaturized, batch processing cannot be performed in the manufacturing process and the mechanical acceleration switch becomes expensive.

Further, such a mechanical acceleration switch uses a movement of a sphere caused by acceleration, thus chattering occurs at the operation time.

SUMMARY OF THE INVENTION

It is therefore an object of the invention to enable mass production of miniaturized, easy-to-handle acceleration detectors at a low cost by using semiconductor microfabrication technologies.

It is another object of the invention to provide a semiconductor acceleration sensor which resolves the effect of an electrostatic attraction force between electrodes and performs stable and high-accuracy switching operation.

To achieve there objects, according to the invention, there is provided a semiconductor acceleration sensor wherein a weight and thin beam parts adjacent to the weight are formed on one of paired substrates made of semiconductors and a moving electrode is formed on the weight and wherein a fixed electrode is formed at a position of the other substrate opposed to the moving electrode with the paired substrates placed facing each other with a predetermined spacing between the moving electrode and the fixed electrode.

According to the present invention, further, either the fixed electrode or the moving electrode is formed with a projection toward the opposed electrode face.

Still further, according to the invention, the moving electrode or the fixed electrode is provided by doping a surface of the semiconductor substrate with impurities or by evaporating a metal thereon.

In another embodiment of the invention, one of the moving electrode and the fixed electrode comprises two electrically isolated electrodes and leads, the other electrode has a width covering the two electrically isolated electrodes, and the projection is made corresponding to the two electrodes.

In the invention, a semiconductor element is built in the semiconductor substrate connected to switch means formed with the moving electrode or the fixed electrode. In still another embodiment of the invention, the semiconductor element is a Zener diode serving as a surge current damper for preventing an excessive surge current from flowing into the sensor electrode and causing a contact failure. In still another embodiment of the invention, the semiconductor element is a load drive transistor for protecting electrode contacts and enabling use under a high load.

According to the invention, there is provided, in a semiconductor acceleration sensor wherein a weight having a predetermined thickness and thin beam parts adjacent to the weight are formed on one of paired rectangular substrates made of semiconductors of silicon, etc., by executing a photolithographic technique and a moving electrode doped with impurities or made of an evaporated metal layer is formed at a position on the weight opposed to the fixed electrode and wherein a fixed electrode doped with impurities or made of an evaporated metal layer is formed at a position of the other substrate opposed to the moving electrode with a predetermined spacing provided between the moving electrode and the fixed electrode for both the electrodes to come in contact with each other and conduct by action of acceleration, whereby the semiconductor acceleration sensor operates, the improvement wherein the fixed electrode or the moving electrode is formed with a projection toward the opposed electrode and the projection and the electrode come in contact with each other and conduct by action of acceleration with a predetermined spacing held between both the electrodes at the time.

DESCRIPTION OF THE PREFERRED EMBODIMENTS

Figure 1:
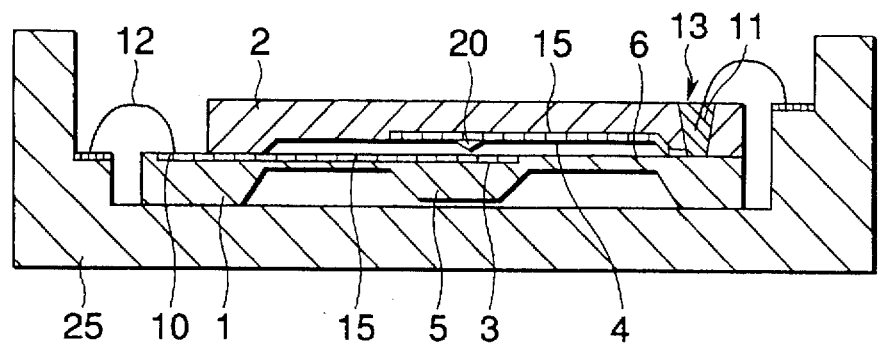
FIG. 1 is a sectional view to show the structure of a semiconductor acceleration sensor according to the invention.

FIG. 1 shows the structure of an acceleration sensor according to the invention.

The acceleration sensor according to the invention comprises rectangular substrates 1 and 2 each made of a semiconductor of silicon, etc. The silicon substrate 1 is formed with a moving electrode 3, a lead 15, and a bonding pad 10 by using normal semiconductor manufacturing technologies, for example, by doping with impurities or evaporating a metal. Portions adjacent to a weight 5 at the center of the substrate 1 are thinned by photolithographic-etching to form beam parts having an appropriate thickness for supporting the weight 5.

The silicon substrate 2 is previously formed with a flat recess having a predetermined depth, and then is formed with a fixed electrode 4 and a lead 15 by doping with impurities or evaporating a metal like the substrate 1. A through hole 11 at one end of the substrate is filled with a resin 13 such as a conductive epoxy resin and the lead wire is connected to an external pad. The fixed electrode 4 of the substrate 2 is formed with a projection 20 as shown in FIG. 1. When the projection 20 comes in contact with the moving contact opposed to the projection, a given spacing $X_0$ is held between the moving and fixed electrodes. The projection 20 may be made to remain when photolithographic-etching is executed or may be provided by forming a thick metal layer at the electrode formation time.

The substrates 1 and 2 thus formed are superposed on each other and joined so that the electrodes are opposed to each other. The substrates 1 and 2 are housed in a package 25 made of ceramic, etc., and are connected to external pad via bonding wires 12 and the conductive resins 13.

Figure 2:
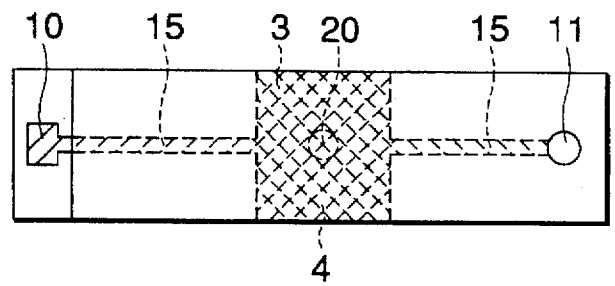
FIG. 2 is a plan view of substrates 1 and 2 of the acceleration sensor shown in FIG. 1 superposed on each other.

FIG. 2 is a plan view of the substrates 1 and 2 superposed on each other. The moving electrode 3 and the fixed electrode 4 are of almost the same dimensions and are in overlapped relation at the same vertical position.

Figure 3:
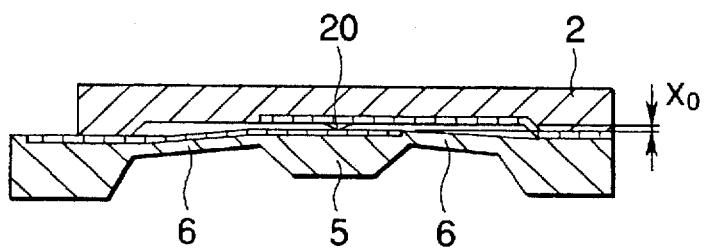
FIG. 3 is an illustration to explain the operation of the acceleration sensor according to the invention.

FIG. 3 shows the operation state of the acceleration sensor. In the figure, if an inertia force acts because of acceleration, the weight 5, which is thicker than other parts and has a large mass, exerts an upward force on the beam parts 6 as shown in FIG. 3 and the thin beam parts 6 warp upward. Upon reception of a force caused by predetermined or more acceleration, the moving electrode 3 comes in contact with the projection 20 made on the fixed electrode 4 and the upper and lower electrodes conduct, performing the switching operation. With the projection 20 in contact with the moving electrode, the predetermined spacing $X_0$ is held between the upper and lower electrodes.

Assuming that the electrode area of the overlap portion of the moving electrode 3 and the fixed electrode 4 is S, that the electrode-to-electrode distance is X, that the voltage applied between the moving and fixed electrodes is Vdd, and that the interelectrode permittivity is $\epsilon$, electrostatic attraction force Fe represented by the following expression (1) acts between both the electrodes:

$$Fe = \epsilon \cdot S \cdot Vdd^2 / 2X^2 \qquad (1)$$

Figure 14:
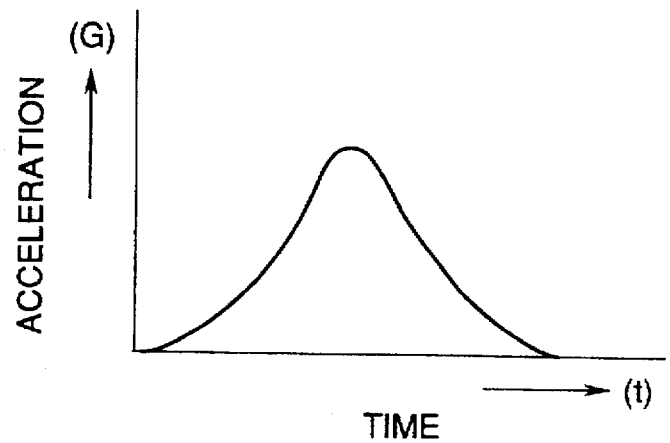
FIG. 14 is an acceleration curve chart.
Figure 15:
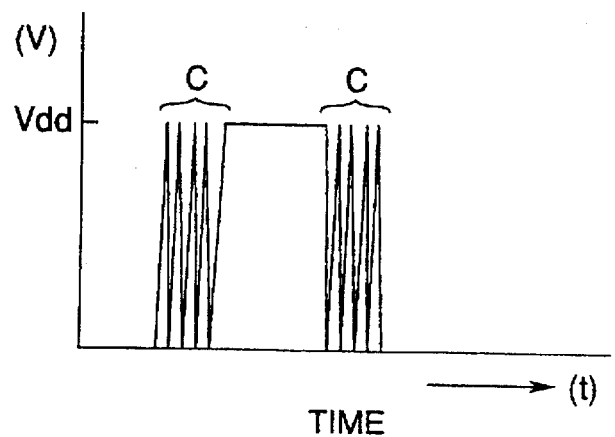
FIG. 15 is a graph to show an output waveform according to a conventional acceleration sensor with respect to the acceleration curve chart shown in FIG. 14.

In contrast to the present invention, an acceleration sensor with no projection 20 is considered. FIGS. 14 and 15 show the relationship between acting acceleration G and detection circuit output V when acceleration is measured with a semiconductor acceleration sensor with no projection 20. As shown in FIG. 14, when the acceleration G acts with time t, the moving electrode 3 of the acceleration switch comes in contact with the fixed electrode 4 at G of a given value or more, closing the circuit. At this time, the electrostatic attraction force Fe acts between the moving and fixed electrodes 3 and 4 as described above; as seen from the above-mentioned expression (1), the electrostatic attraction force Fe is inversely proportional to the square of the electrode-to-electrode distance X. Therefore, if the electrodes are made to approach because of the acceleration, the action of the force abruptly increases, and the moving and fixed electrodes 3 and 4 are mutually attracted and come in contact with each other before the preset sensitivity acceleration G is reached. As both the electrodes come in contact with each other, they conduct and become the same potential and the electrostatic attraction force Fe becomes 0. The contact between the electrodes caused by the electrostatic attraction force is released and both the electrodes move away from each other and then come in contact with each other again when charged. This phenomenon may be repeated, causing chattering to occur.

However, in the semiconductor acceleration switch formed with the projection 20, the action of the electrostatic attraction force Fe between the moving and fixed electrodes 3 and 4 is inversely proportional to the square of the electrode-to-electrode distance X as in expression (1) and largely changes depending on a minute distance. Thus, slight spacing $X_0$ produced by the projection 20 is set to an appropriate value, whereby vibration of the beam parts 6 and occurrence of chattering can be prevented.

The substrate formed with the projection may be the substrate 1 or 2 in principle. In the example, the moving electrode is formed on the opposite side to the face where the weight 5 of the substrate 1, the flat recess is made in the substrate 2, and the predetermined spacing is provided between the moving and fixed electrodes. However, the moving electrode may be formed on the top of the weight 5 and be opposed to the fixed electrode and the weight 5 may be thinned, thereby setting the spacing between the moving and fixed electrodes.

Figure 4A:
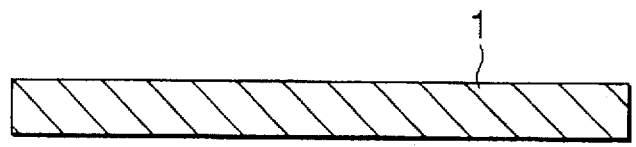
FIGS. 4A, 4B and 4C are illustrations of a manufacturing process of the acceleration sensor according to the invention (substrate 1)
Figure 4B:
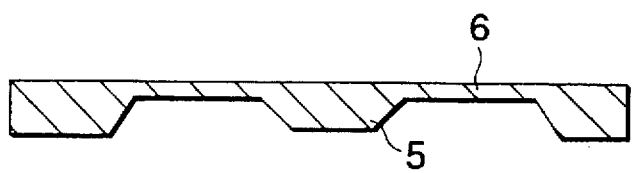

A manufacturing process of the acceleration sensor according to the invention will be discussed with FIGS. 4–7. In the silicon substrate 1 shown in FIG. 4A, the left and right of the part becoming the weight 5 are etched to form thin parts as the beam parts 6 by a photolithographic-technique (FIG. 4B). The thickness of the beam parts 6 can be adjusted according to the etching amount for changing the acceleration magnitude for switching on. Likewise, the thickness and dimensions of the weight 5 can also be formed by the etching process.

Figure 4C:
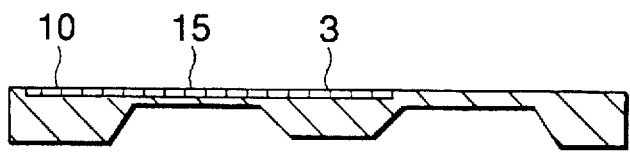

Next, doping with impurities of P+ (N+), etc., is performed or gold (Au), aluminum (Al), etc., is evaporated as patterning according to a photo-etching process pattern, thereby forming the moving electrode 3, the lead 15, and the bonding pad 10 (FIG. 4C).

Figure 5A:
FIGS. 5A, 5B and 5C are illustrations of the manufacturing process of the acceleration sensor according to the invention (substrate 2)
Figure 5B:
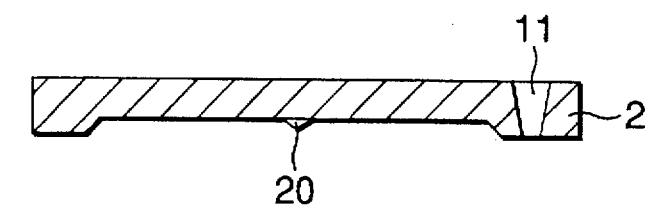

On the other hand, the silicon substrate 2 shown in FIG. 5A is formed with a flat recess and through hole 11 by a photolithographic-technique (FIG. 5B). At this time, the projection 20 is made at the position of the fixed electrode on the silicon substrate 1. To do this, when the recess is etched, a projection etching resist pattern is formed at a predetermined position of the fixed electrode and the recess is etched. When the pattern becomes a predetermined height, the resist pattern is removed and the recess is etched to a predetermined depth, whereby the projection 20 can be formed.

The spacing between the electrodes held in contact with each other is defined in the first half of the etching process and the spacing between the projection and the electrode when no acceleration acts is defined in the latter half of the etching process.

Figure 5C:
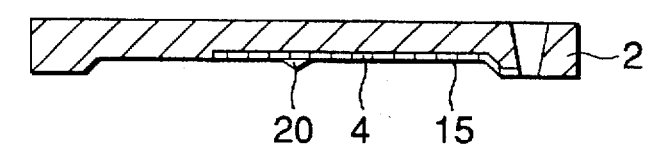

Then, the fixed electrode 4 and the lead 15 are formed as in the substrate 1 (FIG. 5C). The projection 20 can also be made by selectively forming a thick evaporated metal layer.

Figure 6:
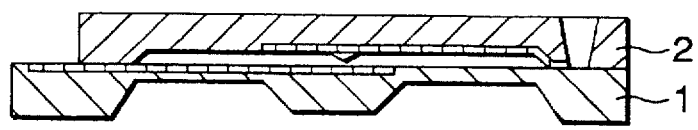
FIG. 6 is an illustration of the manufacturing process of the acceleration sensor according to the invention (joining substrates 1 and 2)
Figure 7:
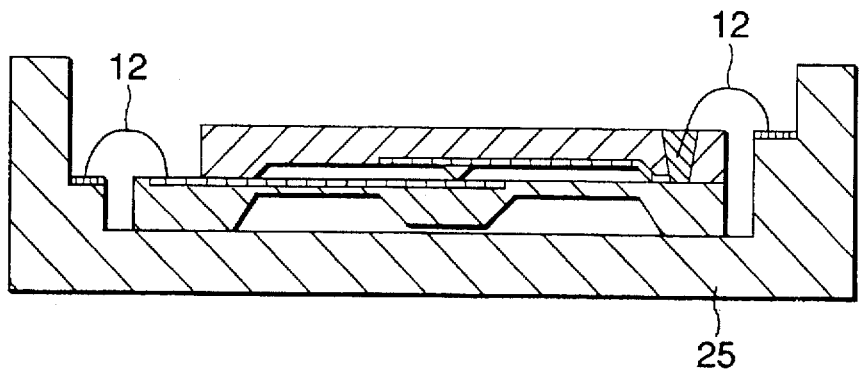
FIG. 7 is an illustration of the manufacturing process of the acceleration sensor according to the invention (packaging)

In the step shown in FIG. 6, the substrates 1 and 2 provided in the previous process are superposed and are joined by anode bonding, etc. The steps usually are executed for the silicon substrates 1 and 2 in wafer units. The bonded bodies of the substrates 1 and 2 thus formed are separated into substrates in chip units by dicing. Next, in the step shown in FIG. 7, each chip is housed in a package 25 made of ceramic, etc., is fixed by die bonding, and is connected to external pads by bonding wires 12, etc., then is covered with a lid, etc., (not shown) for sealing. The packaging step is now complete.

Figure 8:
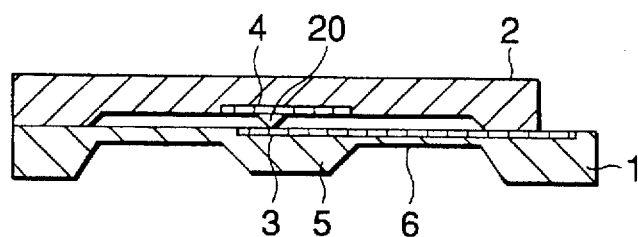
FIG. 8 is a sectional view to show another embodiment of an acceleration sensor according to the invention.
Figure 9:
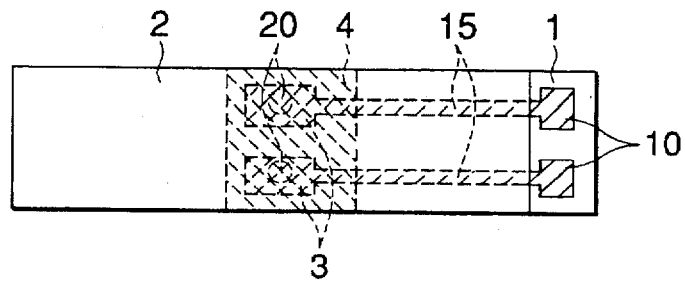
FIG. 9 is a plan view of the acceleration sensor in FIG. 8.

FIGS. 8 and 9 show another embodiment of the invention. In the embodiment, a lead is omitted on one electrode and connection pads of both electrodes of a switch are provided only on one face of one substrate 1.

In the figures, two electrically isolated electrodes 3 and 3 are formed as moving electrodes 3 on a substrate 1 and leads 15 and 15 and bonding pads 10 and 10 derived from the electrodes are also insulated and are drawn out at one end of the substrate 1. A fixed electrode 4 placed thereon is provided in a width covering the two electrically isolated electrodes and is formed with projections 20 and 20 at positions corresponding to the moving electrodes, as shown in FIG. 9.

When given or more acceleration is received and the two moving electrodes 3 and 3 come in contact with the projections of the fixed electrode 4, the moving electrodes conduct via the fixed electrode 4.

Therefore, an acceleration detection signal can be taken out only by wiring connected to the substrate 1 side, so that wiring to the acceleration sensor can be simplified.

Figure 10:
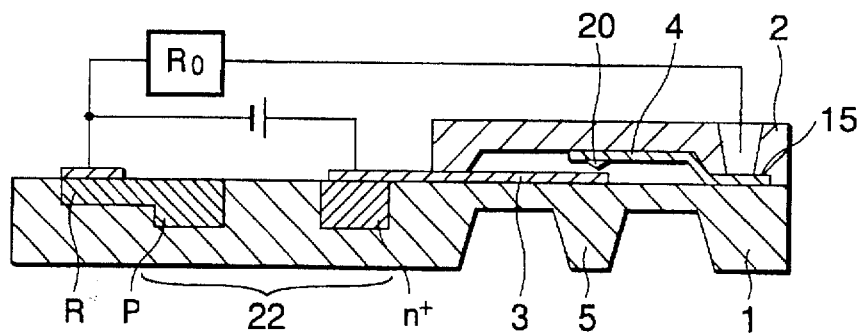
FIG. 10 is a sectional view to show another embodiment of an acceleration sensor according to the invention.
Figure 11:
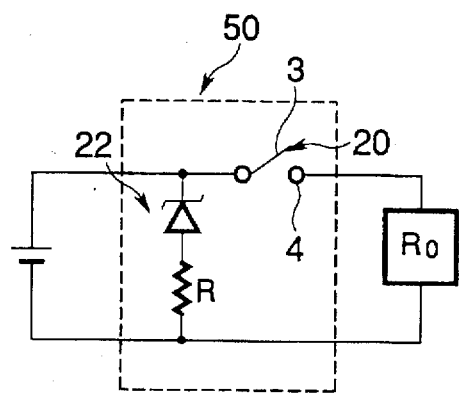
FIG. 11 is a circuit diagram of an equivalent circuit using the acceleration sensor shown in FIG. 10.

FIGS. 10 and 11 show a still another embodiment of the invention. FIG. 10 is a sectional view to show the structure of an acceleration sensor with a Zener diode 22 serving as a surge current damper built in a silicon substrate 1. FIG. 11 shows an equivalent circuit to the acceleration sensor in FIG. 10. The configuration of the acceleration sensor at the right of FIG. 10 is as previously described. As shown at the left of the figure, the Zener diode 22 and a resistor R are built in the silicon substrate 1 and are connected to an external load circuit $R_O$, forming the equivalent circuit shown in FIG. 11.

As known, the equivalent circuit prevents an overcurrent from flowing into a circuit directly passing through the electrode of the acceleration sensor for the load $R_O$ and the sensor electrode from being fixedly secured or burnt.

The fact that the substrates forming the sensor are made of silicon semiconductors can be used to build the elements in one piece.

Resultantly, a range 50 surrounded by the broken line in FIG. 11 is manufactured as the acceleration sensor in one piece and not only the acceleration sensor unit, but also the whole acceleration detector to which the sensor is applied can be miniaturized and simplified.

Figure 12:
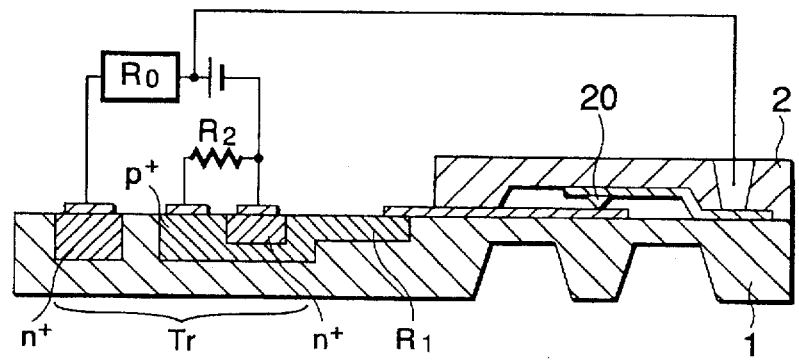
FIG. 12 is a sectional view to show another embodiment of an acceleration sensor according to the invention.
Figure 13:
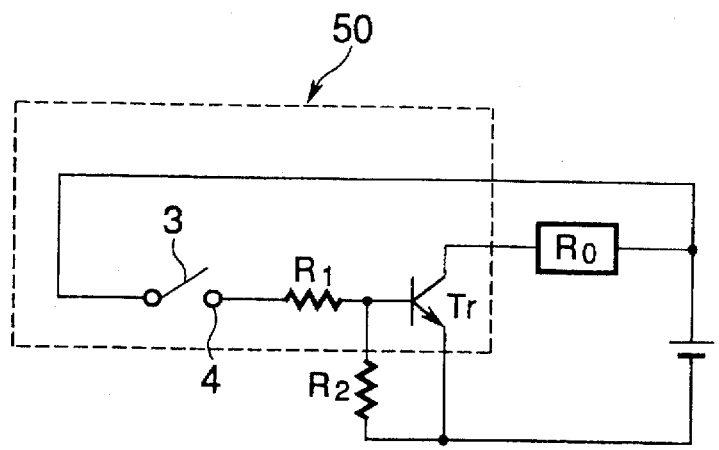
FIG. 13 is a circuit diagram of an equivalent circuit using the acceleration sensor shown in FIG. 12.

FIGS. 12 and 13 show a still another embodiment of the invention. FIG. 12 is a sectional view to show the structure of an acceleration sensor with a load drive transistor Tr built in a silicon substrate 1. FIG. 13 shows an equivalent circuit to the acceleration sensor in FIG. 12. The structure of the sensor portion at the right of FIG. 12 is as previously described. The transistor Tr is built in the silicon substrate at the left of the figure so that a moving electrode of the sensor is connected to a base of the transistor Tr. To use the sensor, the elements are connected to an external load circuit $R_O$, forming the equivalent circuit shown in FIG. 13. As known, the equivalent circuit to the acceleration sensor performs only the switching operation of the transistor Tr for preventing an overcurrent from flowing into an electrode of the acceleration sensor and damage to the electrode.

A range 50 surrounded by the broken line in FIG. 13 is the acceleration sensor formed in one piece; the whole acceleration detector is miniaturized and the acceleration detector can be improved in productivity and can be easily handled on practical use.

Thus, the fact that a silicon semiconductor substrate is used as the substrate formed with the electrodes is used to build the elements required on the configuration of the acceleration sensor or the circuit configuration as detection means in the substrate, whereby the acceleration sensor of the invention can be furthermore miniaturized for handy use and a decrease in cost. In the embodiments, the elements are formed in the substrate 1 on the moving electrode side, but can be built in the substrate 2 on the fixed electrode side on the structure.

As we have discussed, according to the invention, in the semiconductor acceleration sensor, occurrence of chattering of an output waveform of a detection signal is prevented and acceleration can be detected accurately and stably. Necessary elements on the configuration of an acceleration sensor are built in a semiconductor substrate, whereby further miniaturization, mass productivity improvement, cost reduction, and simplification of the sensor (detector) are enabled.

What is claimed is:

1. A semiconductor acceleration sensor wherein a weight and thin beam parts adjacent to said weight are formed on one of paired substrates made of semiconductors and a moving electrode is formed on said weight and wherein a fixed electrode is formed at a position of the other substrate opposed to said moving electrode with said paired substrates placed facing each other with a predetermined spacing between said moving electrode and said fixed electrode, such that said fixed electrode and said moving electrode form a switch and make direct electrical contact when under preselected values of acceleration.

2. The semiconductor acceleration sensor as claimed in claim 1 wherein one of said fixed electrode and said moving electrode is formed with a projection toward the other of said fixed electrode and said moving electrode.

3. The semiconductor acceleration sensor as claimed in claim 2 wherein one of said moving electrode and said fixed electrode comprises two electrically isolated electrodes and leads, wherein the other electrode has a width covering the two electrically isolated electrodes, and wherein said projection is made corresponding to the two electrodes.

4. The semiconductor acceleration sensor as claimed in claim 1 wherein a semiconductor element connected to said switch is built in said semiconductor substrate formed with said moving electrode or said fixed electrode.

5. The semiconductor acceleration sensor as claimed in claim 4 wherein said semiconductor element is a Zener diode serving as a surge current damper.

6. The semiconductor acceleration sensor as claimed in claim 4 wherein said semiconductor element is a load drive transistor.

7. In a semiconductor acceleration sensor wherein a weight having a predetermined thickness and thin beam parts adjacent to said weight are formed on one of paired substrates made of semiconductors including silicon, by executing a photo-etching process, and a moving electrode on said weight, and a fixed electrode at a position of the other substrate opposed to said moving electrode with a predetermined spacing provided between said moving electrode and said fixed electrode for both said electrodes to come in contact with each other and conduct by action of acceleration, whereby said semiconductor acceleration sensor operates, the improvement wherein one of said fixed electrode and said moving electrode is formed with a projection toward the other of said fixed electrode and said moving electrode, and said projection and said electrode opposing said projection come in contact with each other and conduct by action of acceleration with a predetermined spacing held between both said electrodes at the time of said contact.

8. The semiconductor acceleration sensor as claimed in claim 1, wherein said moving electrode is provided by doping a surface of the semiconductor substrate with impurities or by evaporating a metal thereon.

9. The semiconductor acceleration sensor as claimed in claim 1, wherein said fixed electrode is provided by doping a surface of the semiconductor substrate with impurities or by evaporating a metal thereon.

10. The semiconductor acceleration sensor as claimed in claim 7, wherein said moving electrode is provided by doping a surface of the semiconductor substrate with impurities or by evaporating a metal thereon.

11. The semiconductor acceleration sensor as claimed in claim 7, wherein said fixed electrode is provided by doping a surface of the semiconductor substrate with impurities or evaporating a metal thereon.

* * * * *